(12) United States Patent
Mao et al.

(10) Patent No.: US 10,447,134 B2
(45) Date of Patent: Oct. 15, 2019

(54) LINEAR VIBRATION MOTOR

(71) Applicant: AAC Technologies Pte, Ltd., Singapore (SG)

(72) Inventors: Lubin Mao, Shenzhen (CN); Fanghua Ling, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 337 days.

(21) Appl. No.: 15/646,922

(22) Filed: Jul. 11, 2017

(65) Prior Publication Data

US 2018/0297063 A1 Oct. 18, 2018

(30) Foreign Application Priority Data

Apr. 14, 2017 (CN) ...................... 2017 2 0390915 U

(51) Int. Cl.
| | |
|---|---|
| *H02K 33/00* | (2006.01) |
| *B06B 1/04* | (2006.01) |
| *H02K 5/04* | (2006.01) |
| *H02K 33/02* | (2006.01) |
| *H02K 33/18* | (2006.01) |

(52) U.S. Cl.
CPC ............. *H02K 33/02* (2013.01); *B06B 1/045* (2013.01); *H02K 33/00* (2013.01); *H02K 33/18* (2013.01)

(58) Field of Classification Search
CPC .......... B06B 1/045; H02K 5/04; H02K 33/00; H02K 33/02; H02K 33/18
See application file for complete search history.

(56) References Cited

U.S. PATENT DOCUMENTS

| | | | | |
|---|---|---|---|---|
| 9,871,432 | B2* | 1/2018 | Mao ........................ | H02K 33/16 |
| 10,008,894 | B2* | 6/2018 | Mao ........................ | H02K 1/34 |
| 10,220,412 | B2* | 3/2019 | Mao ........................ | B06B 1/045 |
| 2009/0267423 | A1* | 10/2009 | Kajiwara ............... | H02K 33/02 |
| | | | | 310/36 |
| 2017/0117788 | A1* | 4/2017 | Hou ........................ | H02K 1/34 |

\* cited by examiner

*Primary Examiner* — Mohamad A Musleh
(74) *Attorney, Agent, or Firm* — IPro, PLLC; Na Xu

(57) ABSTRACT

Provided is a linear vibration motor, including a housing having accommodating space, a vibrating unit and a stator unit accommodated in the housing, and an elastic member suspending the vibrating unit in the housing, the elastic member includes a first elastic portion and a second elastic portion which are arranged at two ends of the vibrating unit, and a connecting member connecting the first elastic portion and the second elastic portion as an integrated structure, both the first elastic portion and the second elastic portion includes two elastic arms which are arranged by crossing with each other. The linear vibration motor provided by the present disclosure effectively improves support strength of the elastic member in Z axis direction, and the vibrating unit will not offset in Y axis direction during vibrating. The elastic member is integrated as a whole, which is easy to assemble, thereby further improving vibration stability.

8 Claims, 8 Drawing Sheets

LINEAR VIBRATION MOTOR

TECHNICAL FIELD

The present disclosure relates to the technical field of motors and, in particular, to a linear vibration motor.

BACKGROUND

With the development of electronic technologies, portable consumption electronic product such as cellphone, handheld game player, navigation device or handheld multimedia entertainment device and the like is becoming more and more popular. Generally, these electronic products will use a vibration motor for system feedback, such as call prompt, message prompt, navigation prompt of a cellphone, vibration feedback of a game player etc. Such widespread application requires high performance and long service life of the vibration motor.

In the relevant art, the linear vibration motor includes a housing having accommodating space, a vibrating unit and a stator unit accommodated in the housing, an elastic member fixing and suspending the vibrating unit in the accommodating space, the stator unit drives the vibrating unit to move reciprocally and linearly, so that the linear vibration motor vibrates. The elastic member is designed as a U shape, which provides support in Z direction and restoring force in X direction.

However, when an elastic member with a U shape is used to support the vibrating unit, the support in Z direction is poor, resulting in that the performance of the linear vibration motor is not stable. In addition, in the relevant art, two U-shaped elastic members are respectively assembled on opposite ends of the vibrating unit, the assembly is complicated, the positioning accuracy is poor, which may further influence the vibration stability of the linear vibration motor.

Therefore, there is a necessity to provide a linear vibration motor, so as to solve the above technical problem.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DESCRIPTION OF EMBODIMENTS

The present disclosure will be further illustrated with reference to the accompanying drawings and following embodiments.

Figure 1:
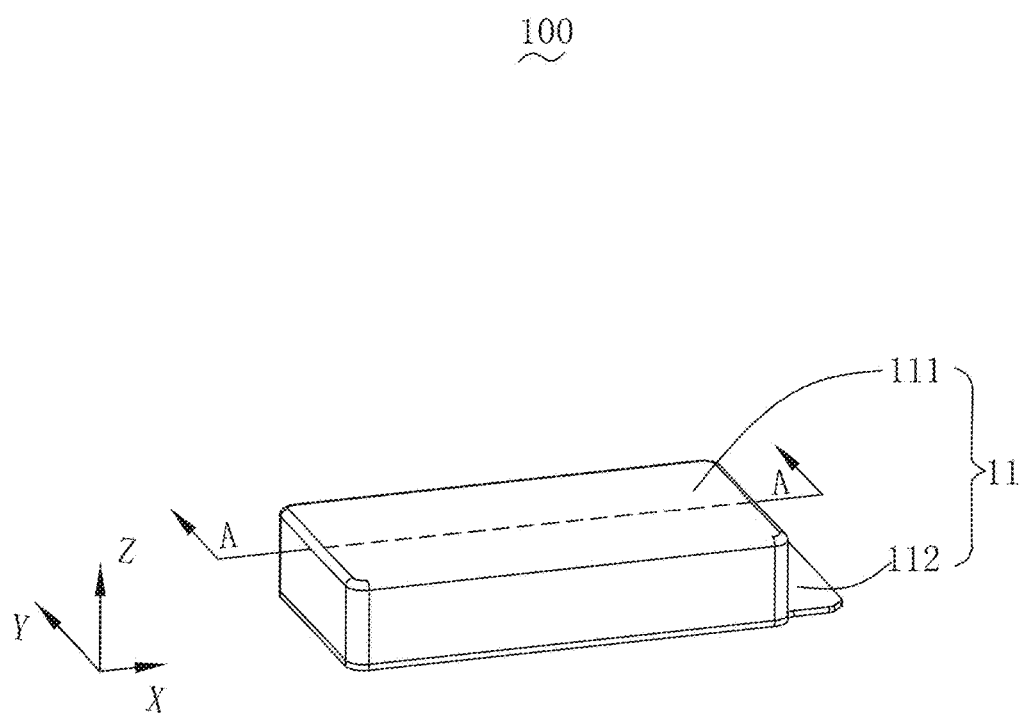
FIG. 1 is a perspective view of a linear vibration motor in accordance with an exemplary embodiment of the present disclosure.
Figure 2:
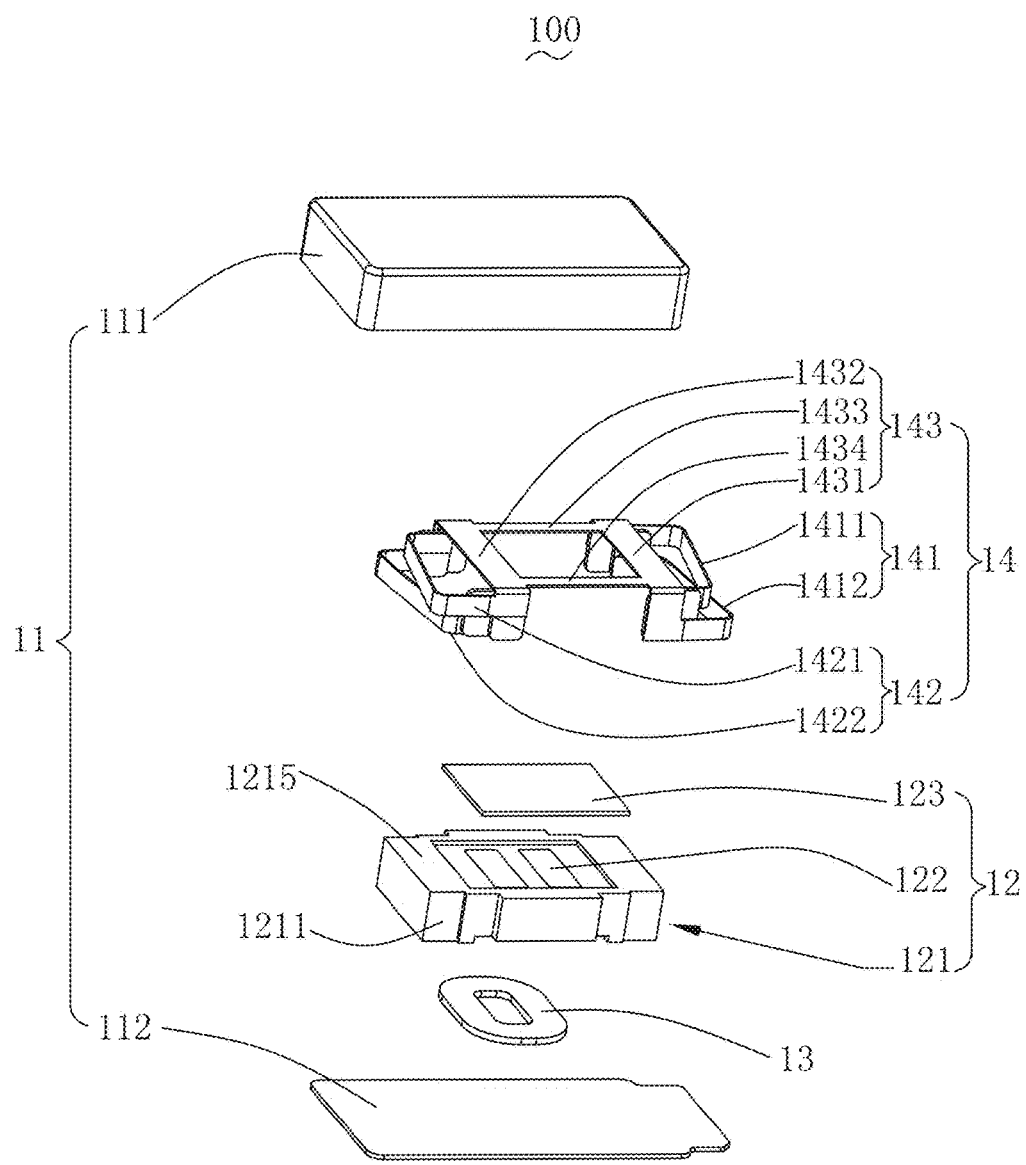
FIG. 2 is an exploded schematic view of the linear vibration motor shown in FIG. 1.
Figure 3:
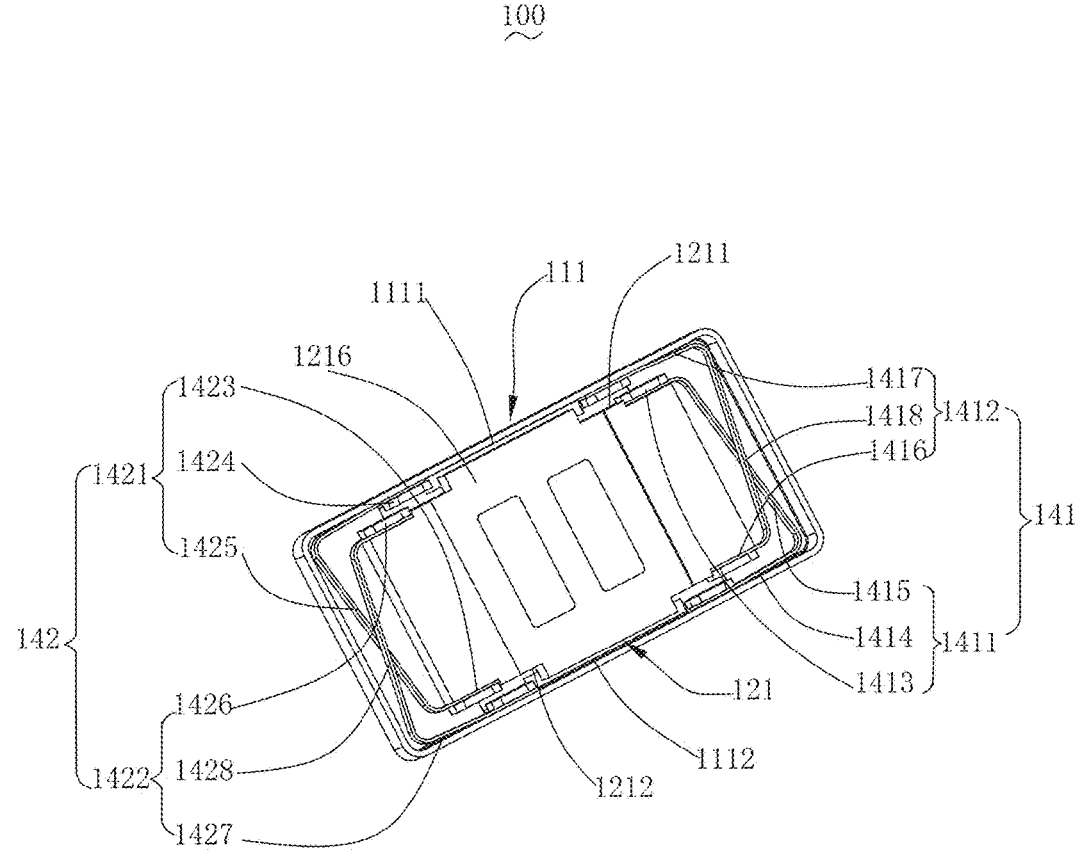
FIG. 3 is a partial structural view of the linear vibration motor shown in FIG. 1.
Figure 4:
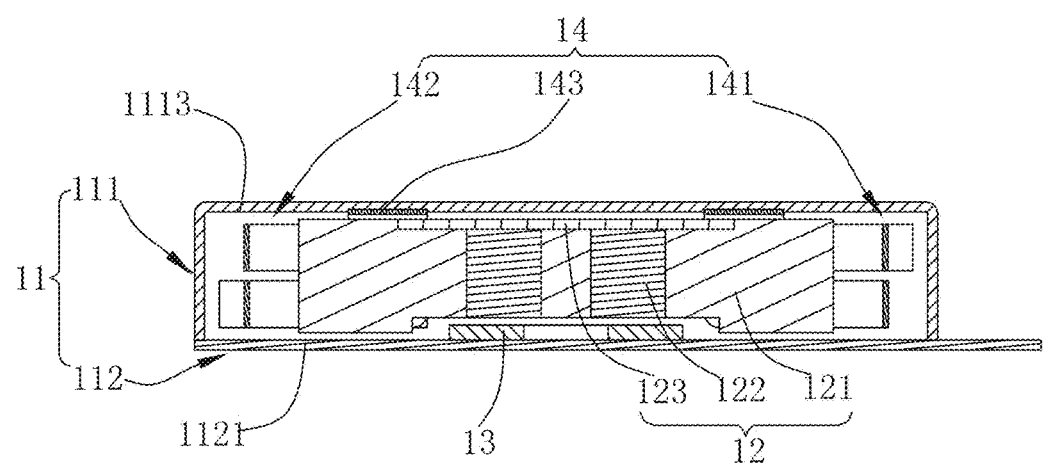
FIG. 4 is a cross sectional view of the linear vibration motor shown in FIG. 1 along A-A line.
Figure 5:
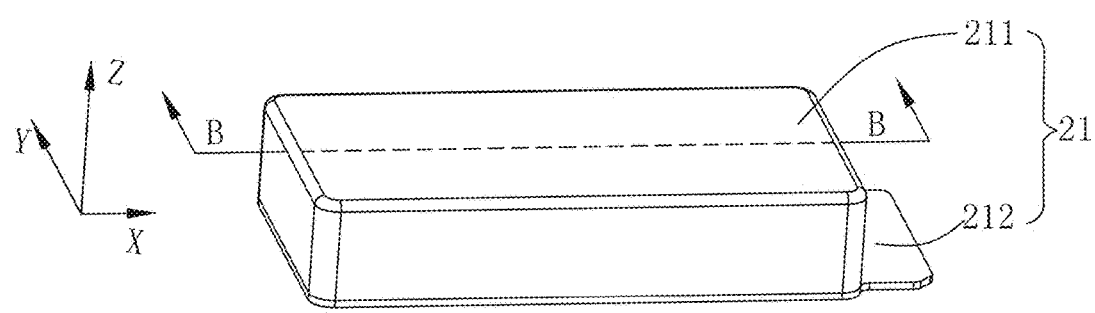
FIG. 5 is a perspective view of a linear vibration motor in accordance with another exemplary embodiment of the present disclosure.

Please refer to FIGS. 1-4, FIG. 1 is a perspective view of a linear vibration motor in accordance with an exemplary embodiment of the present disclosure; FIG. 2 is an exploded schematic view of the linear vibration motor shown in FIG. 1; FIG. 3 is a partial structural view of the linear vibration motor shown in FIG. 1; FIG. 4 is a cross sectional view of the linear vibration motor shown in FIG. 1 along A-A line. The linear vibration motor 100 includes a housing 11, a vibrating unit 12 and a stator unit 13 accommodated in the housing 11, and an elastic member 14 suspending the vibrating unit 12 in the housing 11. For ease of description, an X, Y and Z axes coordinate system is presented in the figures. X axis represents a vibrating direction of the linear vibrating motor 100, Y axis and Z axis represent directions perpendicular to the vibrating direction.

The housing 11 includes an upper housing 111 and a lower housing 112, the upper housing 111 and the lower housing 112 surround to form accommodating space. The vibrating unit 12, a stator unit 13 and the elastic member 14 are arranged in the accommodating space.

The vibrating unit 12 includes a weight 121 having an accommodating hole (not labeled), a magnet 122 and a pole plate 123. The magnet 122 is arranged in the accommodating hole, and the pole plate 123 covers the magnet 122.

The weight 121 includes a first side wall 1211 and a second side wall 1212 which are arranged opposite to and spaced from each other along the vibrating direction (X axis direction), and a first surface 1215 and a second surface 1216 which are arranged opposite to and spaced from each other and connected with the first side wall 1211 and the second side wall 1212, respectively. The second surface 1216 is arranged close to the stator unit 13, and the first surface 1215 is arranged away from the stator unit 13.

The upper housing 111 includes a first inner wall 1111 and a second inner wall 1112 arranged at two sides of the vibrating unit 12, and a top wall 1113 connecting the first inner wall 1111 with the second inner wall 1112. When the lower housing 112 and the upper housing 111 are enclosing, the lower housing 112 acts as a bottom wall 1121 arranged opposite to the top wall 1113 an connecting the first inner wall 1111 with the second inner wall 1112. The first side wall 1211 is arranged opposite to and spaced from the first inner wall 1111, the second side wall 1212 is arranged opposite to and spaced from the second inner wall 1112, the first surface 1215 is arranged opposite to and spaced from the top wall 1113, and the second surface 1216 is arranged opposite to and spaced from the bottom wall 1121.

The stator unit 13 is a coil, which is arranged below and spaced from the magnet 122. A magnetic field generated by the driving coil and a magnetic field generated by the magnet 122 interact with each other, so as to drive the vibrating unit to move reciprocally and linearly and thus to generate vibration.

The elastic member 14 includes a first elastic portion 141 and a second elastic portion 142 which are arranged opposite to and spaced from each other, and a connecting member 143 connecting the first elastic portion 141 with the second elastic portion 142. The first elastic portion 141 and the second elastic portion 142 respectively clamp two ends of the weight 121 along its vibrating direction, so as to fix and suspend the vibrating unit 12 in the accommodating space. The elastic member 14 is integrated as a whole.

The first elastic portion 141 includes a first elastic arm 1411, and a second elastic arm 1412 arranged by crossing with the first elastic arm 1411.

The first elastic arm 1411 includes a first fixing portion 1413, a second fixing portion 1414, and a first connecting portion 1415 connecting the first fixing portion 1413 with the second fixing portion 1414. The first fixing portion 1413 is connected with the first side wall 1211, and the second fixing portion 1414 is connected with the second inner wall 1112.

The second elastic arm 1412 includes a third fixing portion 1416, a fourth fixing portion 1417, and a second connecting portion 1418 connecting the third fixing portion 1416 with the fourth fixing portion 1417. The third fixing portion 1416 is connected with the second side wall 1212, and the fourth fixing portion 1417 is connected with the first inner wall 1111. The first connecting portion 1415 is arranged by crossing with the second connecting portion 1418.

The second elastic portion 142 includes a third elastic arm 1421, and a fourth elastic arm 1422 arranged by crossing with the third elastic arm 1421.

The third elastic arm 1421 includes a fifth fixing portion 1423, a sixth fixing portion 1424, and a third connecting portion 1425 connecting the fifth fixing portion 1423 with the sixth fixing portion 1424. The fifth fixing portion 1423 is connected with the second side wall 1212, and the sixth fixing portion 1424 is connected with the first inner wall 1111.

The fourth elastic arm 1422 includes a seventh fixing portion 1426, an eighth fixing portion 1427, and a fourth connecting portion 1428 connecting the seventh fixing portion 1426 with the eight fixing portion 1427. The seventh fixing portion 1426 is connected with the first side wall 1211, and the eighth fixing portion 1427 is connected with the second inner wall 1112. The third connecting portion 1425 is arranged by crossing with the fourth connecting portion 1428.

The connecting member 143 includes a first connecting arm 1431, a second connecting arm 1432, a third connecting arm 1433 and a fourth connecting arm 1434. The first connecting arm 1431 connects the second fixing portion 1414 with the fourth fixing portion 1417, the second connecting arm 1432 connects the sixth fixing portion 1424 with the eighth fixing portion 1427, the third connecting arm 1433 and the fourth connecting arm 1434 are arranged opposite to and spaced from each other, and two ends thereof are respectively connected with the first connecting arm 1431 and the second connecting arm 1432.

In the present embodiment, the connecting member 143 abuts with the top wall 1113. Obviously, the connecting member 143 can also abut with the bottom wall 1121.

It should be noted that, the connecting member 143 forms an integrated flat member.

Figure 6:
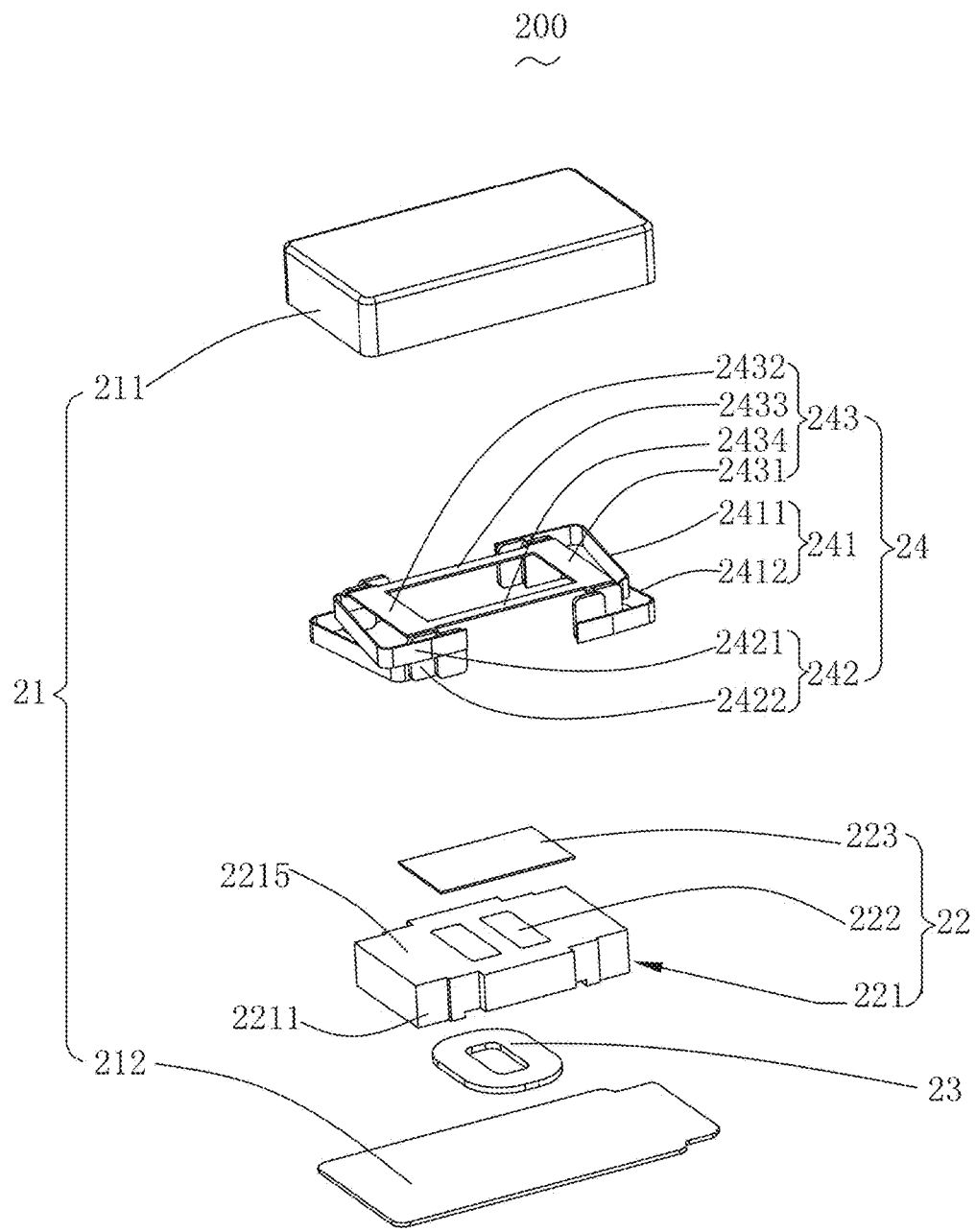
FIG. 6 is an exploded schematic view of the linear vibration motor shown in FIG. 5.
Figure 7:
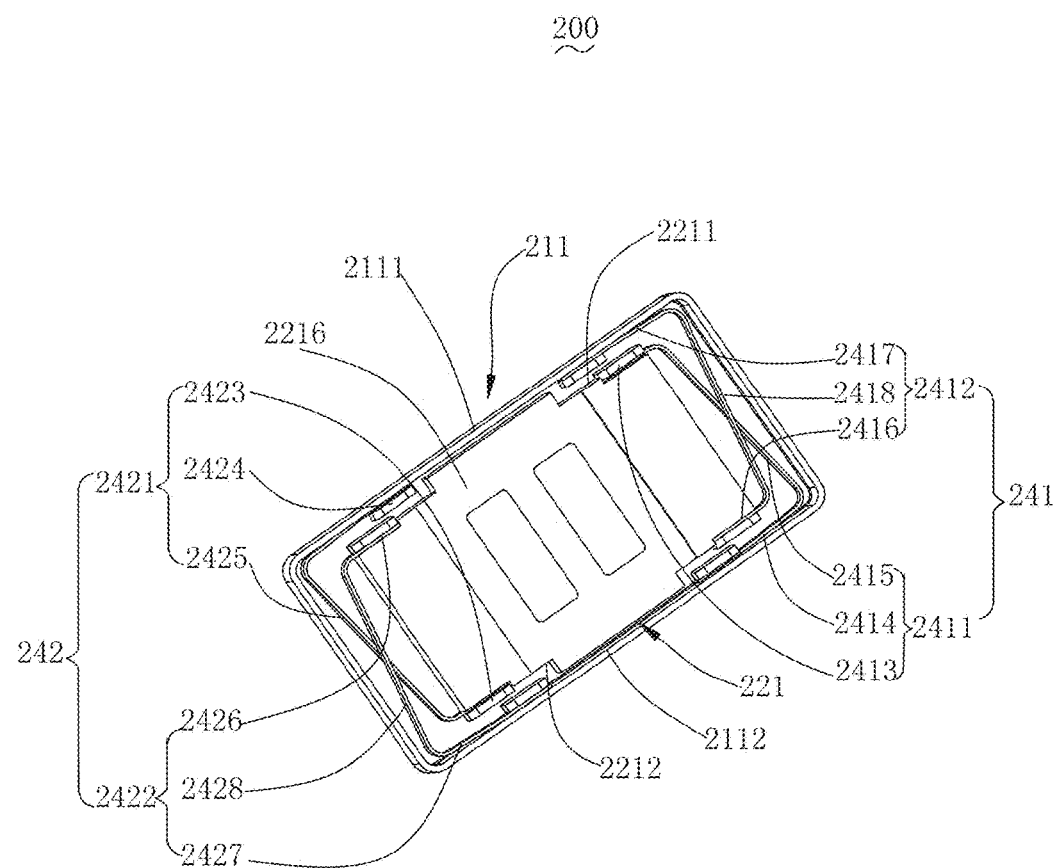
FIG. 7 is a partial structural view of the linear vibration motor shown in FIG. 5.
Figure 8:
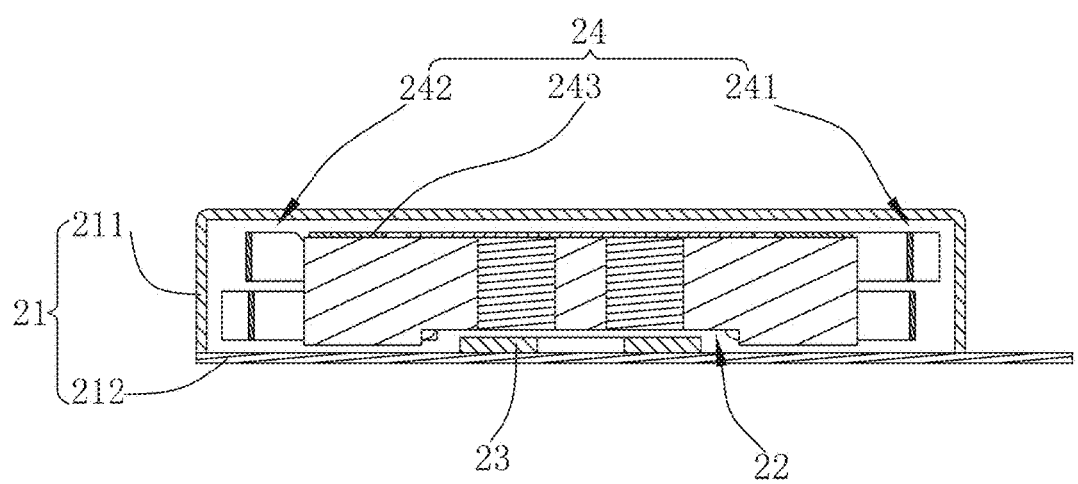
FIG. 8 is a cross sectional view of the linear vibration motor shown in FIG. 5 along B-B line.

Please refer to FIGS. 5-8, FIG. 5 is a perspective view of a linear vibration motor in accordance with another exemplary embodiment of the present disclosure; FIG. 6 is an exploded schematic view of the linear vibration motor shown in FIG. 5; FIG. 7 is a partial structural view of the linear vibration motor shown in FIG. 5; FIG. 8 is a cross sectional view of the linear vibration motor shown in FIG. 5 along B-B line. The linear vibration motor 200 includes a housing 21, a vibrating unit 22 and a stator unit 23 accommodated in the housing 21, and an elastic member 24 suspending the vibrating unit 22 in the housing 21. For ease of description, an X, Y and Z axes coordinate system is presented in the figures. X axis represents a vibrating direction of the linear vibrating motor 200, Y axis and Z axis represent directions perpendicular to the vibrating direction.

The housing 21 includes an upper housing 211 and a lower housing 212, the upper housing 211 and the lower housing 212 surround to form accommodating space. The vibrating unit 22, a stator unit 23 and the elastic member 24 are arranged in the accommodating space.

The vibrating unit 22 includes a weight 221 having an accommodating hole (not labeled), a magnet 222 and a pole plate 223. The magnet 222 is arranged in the accommodating hole, and the pole plate 223 covers the magnet 222.

The weight 221 includes a first side wall 2211 and a second side wall 2212 which are arranged opposite to and spaced from each other along the vibrating direction (X axis direction), and a first surface 2215 and a second surface 2216 which are arranged opposite to and spaced from each other and connected with the first side wall 2211 and the second side wall 2212, respectively. The second surface 2216 is arranged close to the stator unit 23, and the first surface 2215 is arranged away from the stator unit 23.

The upper housing 211 includes a first inner wall 2111 and a second inner wall 2112 arranged at two sides of the vibrating unit 22. The first side wall 2211 is arranged opposite to and spaced from the first inner wall 2111, and the second side wall 2212 is arranged opposite to and spaced from the second inner wall 2112.

The stator unit 23 is a coil, which is arranged below and spaced from the magnet 222. A magnetic field generated by the driving coil and a magnetic field generated by the magnet 222 interact with each other, so as to drive the vibrating unit to move reciprocally and linearly and thus to generate vibration.

The elastic member 24 includes a first elastic portion 241 and a second elastic portion 242 which are arranged opposite to and spaced from each other, and a connecting member 243 connecting the first elastic portion 241 with the second elastic portion 242. The first elastic portion 241 and the second elastic portion 242 respectively clamp two ends of the weight 221 along its vibrating direction, so as to fix and suspend the vibrating unit 22 in the accommodating space. The elastic member 24 is integrated as a whole.

The first elastic portion 241 includes a first elastic arm 2411, and a second elastic arm 2412 arranged by crossing with the first elastic arm 2411.

The first elastic arm 2411 includes a first fixing portion 2413, a second fixing portion 2414, and a first connecting portion 2415 connecting the first fixing portion 2413 with the second fixing portion 2414. The first fixing portion 2413 is connected with the first side wall 2211, and the second fixing portion 2414 is connected with the second inner wall 2112.

The second elastic arm 2412 includes a third fixing portion 2416, a fourth fixing portion 2417, and a second connecting portion 2418 connecting the fourth fixing portion 2416 with the fourth fixing portion 2417. The third fixing portion 2416 is connected with the second side wall 2212, and the fourth fixing portion 2417 is connected with the first inner wall 2111. The first connecting portion 2415 is arranged by crossing with the second connecting portion 2418.

The second elastic portion 242 includes a third elastic arm 2421, and a fourth elastic arm 2422 arranged by crossing with the third elastic arm 2421.

The third elastic arm 2421 includes a fifth fixing portion 2423, a sixth fixing portion 2424, and a third connecting portion 2425 connecting the fifth fixing portion 2423 with the sixth fixing portion 2424. The fifth fixing portion 2423 is connected with the second side wall 2212, and the sixth fixing portion 2424 is connected with the first inner wall 2111.

The fourth elastic arm 2422 includes a seventh fixing portion 2426, an eighth fixing portion 2427, and a fourth connecting portion 2428 connecting the seventh fixing portion 2426 with the eight fixing portion 2427. The seventh fixing portion 2426 is connected with the first side wall 2211, and the eighth fixing portion 2427 is connected with the second inner wall 2112. The third connecting portion 2425 is arranged by crossing with the fourth connecting portion 2428.

The connecting member 243 includes a first connecting arm 2431, a second connecting arm 2432, a third connecting arm 2433 and a fourth connecting arm 2434. The first connecting arm 2431 connects the first fixing portion 2413 with the third fixing portion 2416, the second connecting arm 2432 connects the fifth fixing portion 2423 with the seventh fixing portion 2426, the third connecting arm 2433 and the fourth connecting arm 2434 are arranged opposite to and spaced from each other, and two ends thereof are respectively connected with the first connecting arm 2431 and the second connecting arm 2432.

In the present embodiment, the connecting member 243 abuts with the first surface 2215. Obviously, the connecting member 243 can also abut with the second surface 2216.

It should be noted that, the connecting member 243 forms an integrated flat member.

Compared with the prior art, the beneficial effect of the present disclosure lies in that: the elastic member of the linear motor provided by the present disclosure includes a first elastic portion and a second elastic portion which are respectively provided at two ends of the vibrating unit, a connecting member connecting the first elastic portion with the second elastic portion as a whole. Such a structural design of the elastic member guarantees the integrity of the elastic member, which effectively improves support strength of the elastic member in Z axis direction, and the vibrating unit will not offset in Y axis direction during vibrating. The elastic member is integrated as a whole, during assembling, only one elastic member is necessary, which is easy to assemble, and the positioning is accurate, thereby further improving vibration stability of the linear vibration motor.

The above merely shows embodiments of the present disclosure. It should be noted that, improvements can be made by those skilled in the art without departing from the inventive concept of the present disclosure. However, these shall belong to the protection scope of the present disclosure.

What is claimed is:

1. A linear vibration motor, comprising:
    a housing having accommodating space,
    a vibrating unit accommodated in the housing,
    a stator unit accommodated in the housing, and
    an elastic member suspending the vibrating unit in the housing,
    wherein the vibrating unit comprises a first side wall and a second side wall which are arranged opposite to and spaced from each other along a vibrating direction, the housing comprises a first inner wall and a second inner wall arranged at two sides of the vibrating unit, wherein, the first inner wall and the first side wall are arranged opposite to and spaced from each other, and the second inner wall and the second side wall are arranged opposite to and spaced from each other,
    wherein the elastic member comprises a first elastic portion and a second elastic portion respectively arranged at two ends of the vibrating unit, the first elastic portion comprises a first elastic arm and a second elastic arm which are arranged by crossing with each other, the first elastic arm comprises a first fixing portion connected with the first side wall, a second fixing portion connected with the second inner wall, and a first connecting portion connecting the first fixing portion with the second fixing portion, the second elastic arm comprises a third fixing portion connected with the second side wall, a fourth fixing portion connected with the first inner wall, and a second connecting portion connecting the third fixing portion with the fourth fixing portion, the first connecting portion is arranged by crossing with the second connecting portion; the second elastic portion comprises a third elastic arm, and a fourth elastic arm arranged by crossing with the third elastic arm, the third elastic arm comprises a fifth fixing portion connected with the second side wall, a sixth fixing portion connected with the first inner wall, and a third connecting portion connecting the fifth fixing portion with the sixth fixing portion, the fourth elastic arm comprises a seventh fixing portion connected with the first side wall, an eighth fixing portion connected with the second inner wall, and a fourth connecting portion connecting the seventh fixing portion with the eight fixing portion, the third connecting portion is arranged by crossing with the fourth connecting portion, the elastic member further comprises a connecting member connecting the second fixing portion, the fourth fixing portion, the sixth fixing portion and the eighth fixing portion, the connecting member abuts with the housing.

2. The linear vibration motor as described in claim 1, wherein the connecting member comprises a first connecting arm connecting the second fixing portion with the fourth fixing portion, a second connecting arm connecting the sixth fixing portion with the eighth fixing portion, and a third connecting arm and a fourth connecting arm which are arranged opposite to and spaced from each other and connecting the first connecting arm and the second connecting arm.

3. The linear vibration motor as described in claim 1, wherein the housing comprises a top wall and a bottom wall which are arranged opposite to and spaced from each other and connecting the first inner wall and the second inner wall, the connecting member abuts with the top wall or the bottom wall.

4. The linear vibration motor as described in claim 1, wherein the elastic member is integrated as a whole.

5. A linear vibration motor, comprising:
    a housing having accommodating space,
    a vibrating unit accommodated in the housing,
    a stator unit accommodated in the housing, and
    an elastic member suspending the vibrating unit in the housing,
    wherein the vibrating unit comprises a first side wall and a second side wall which are arranged opposite to and spaced from each other along a vibrating direction, the housing comprises a first inner wall and a second inner wall arranged at two sides of the vibrating unit, wherein, the first inner wall and the first side wall are arranged opposite to and spaced from each other, and the second inner wall and the second side wall are arranged opposite to and spaced from each other,
    wherein the elastic member comprises a first elastic portion and a second elastic portion respectively arranged at two ends of the vibrating unit, the first elastic portion comprises a first elastic arm and a second elastic arm which are arranged by crossing with each other, the first elastic arm comprises a first fixing portion connected with the first side wall, a second fixing portion connected with the second inner wall, and a first connecting portion connecting the first fixing portion with the second fixing portion, the second elastic arm comprises a third fixing portion connected with the second side wall, a fourth fixing portion connected with the first inner wall, and a second connecting portion connecting the third fixing portion with the fourth fixing portion, the first connecting portion is arranged by crossing with the second connecting portion; the second elastic portion comprises a third elastic arm, and a fourth elastic arm arranged by crossing with the third elastic arm, the third elastic arm comprises a fifth fixing portion connected with the second side wall, a sixth fixing portion connected with the first inner wall, and a third connecting portion connecting the fifth fixing portion with the sixth fixing portion, the fourth elastic arm comprises a seventh fixing portion connected with the first side wall, an eighth fixing portion connected with the second inner wall, and a fourth connecting portion connecting the seventh fixing portion with the eight fixing portion, the third connecting portion is arranged by crossing with the fourth connecting portion, the elastic member further comprises a connecting member connecting the first fixing portion, the third fixing portion, the fifth fixing portion and the seventh fixing portion, the connecting member abuts with the vibrating unit.

6. The linear vibration motor as described in claim 5, wherein the connecting member comprises a first connecting arm connecting the first fixing portion with the third fixing portion, a second connecting arm connecting the fifth fixing portion with the seventh fixing portion, and a third connecting arm and a fourth connecting arm which are arranged opposite to and spaced from each other and connecting the first connecting arm and the second connecting arm.

7. The linear vibration motor as described in claim 5, wherein the vibrating unit comprises a first surface and a second surface which are arranged opposite to and spaced from each other and connecting the first side wall and the second side wall, the connecting member abuts with the first surface or the second surface.

8. The linear vibration motor as described in claim 5, wherein the elastic member is integrated as a whole.

* * * * *